United States Patent [19]

Avery

[11] 4,115,260

[45] Sep. 19, 1978

[54] SELECTIVE REMOVAL OF IRON CYANIDE ANIONS FROM FLUIDS CONTAINING THIOCYANATES

[75] Inventor: Noyes L. Avery, Oreland, Pa.

[73] Assignee: Rohm and Haas Company, Philadelphia, Pa.

[21] Appl. No.: 785,475

[22] Filed: Apr. 7, 1977

[51] Int. Cl.$^2$ ............................................. B01D 15/06
[52] U.S. Cl. .................................. 210/34; 210/37 B; 75/101 BE; 423/367
[58] Field of Search ....................... 210/24, 30, 32, 34, 210/37 B, 37 R, DIG. 31; 423/367, 377; 75/101 BE

[56] References Cited

U.S. PATENT DOCUMENTS

| | | | |
|---|---|---|---|
| 3,869,383 | 3/1975 | Shimamura et al. | 210/34 X |
| 3,931,004 | 1/1976 | Shimamura et al. | 210/37 B |

*Primary Examiner*—Ferris H. Lander
*Attorney, Agent, or Firm*—John E. Taylor, III

[57] ABSTRACT

Certain strongly basic, acrylic-based anion exchange resins are employed to selectively remove ferrocyanide and ferricyanide anions from aqueous fluids containing thiocyanate anions. A portion of the resin regeneration fluid may be reclaimed for re-use.

10 Claims, No Drawings

SELECTIVE REMOVAL OF IRON CYANIDE ANIONS FROM FLUIDS CONTAINING THIOCYANATES

THE INVENTION

This invention relates to the selective removal of iron cyanides from an aqueous mixture containing the same. In particular, it concerns the separation of one or more iron cyanide complex ions from an aqueous mixture containing thiocyanate anions using a specific, strongly basic, acrylic anion exchange resin.

Cyanides occur as pollutants in many industrial waste streams, particularly those of the chemicals, metals, and electroplating industries. These streams are aqueous, and generally contain large quantities (1000–10,000 parts per million) of inorganic solids. The cyanide may be present as free cyanide, or as a complex with one of several metals, including iron. Levels of cyanide are usually below 2000 parts per million, but significantly above the levels which are considered acceptable by industrial standards.

Because of their toxicity, cyanides have been the subject of much interest by government regulatory agencies and industries with cyanide-containing waste streams, and considerable effort and money is being expended on cyanide removal. Several methods have been employed with varying success.

Alkaline chlorination is one such method; it oxidizes free cyanide, but it fails to oxidize complexed cyanides. It also is inefficient in its use of chlorine and caustic for cyanide removal, and even more inefficient because chlorine and caustic are consumed in concurrent reactions with other oxidizable waste-stream constituents. In addition cyanates and chloramines, which may form during chlorination, introduce their own elements of toxicity.

Total demineralization by ion exchange has also been used. This approach is inefficient because the anion exchange resin must remove high levels of of other anions along with the cyanides, resulting in a low effective capacity for cyanides.

Selective anion exchange methods have enjoyed considerable attention recently. Certain cyanide complexes, including ferrocyanide, $Fe(CN)_6^{-4}$, and ferricyanide, $Fe(CN)_6^{-3}$, are removed by anion exchange resins far more readily than other anions including the free cyanide anion. Fries, in U.S. Pat. No. 3,788,983, makes use of this phenomenon by converting free cyanide to the ferrocyanide complex; this is done by adding a ferrous salt solution to an alkaline cyanide-containing waste stream. At the high pH excess ferrous ions form the ferrous hydroxide precipitate, and may be removed by settling, filtration or other separation techniques.

The anion exchange resin employed by Fries is a weakly basic resin in the acid salt form, and requires that the pH of a fluid to be treated be adjusted to 4–7 before treatment. At a pH above about 7 the acid salt form of the resin is rapidly converted to the inoperative free-base form, and at a pH below about 4 the blue cyanide complex precipitate, $Fe_3(CN)_6$, forms; this finely divided precipitate tends to foul the resin bed, and since it is not bound by the resin, some of it will also pass through the bed and appear in the effluent. Thus, at least one pH adjustment, from the alkaline pH for ferrocyanide formation to the acidic pH for treatment, is required in the process described by Fries.

In that process, the resin is regenerated with a caustic solution, such as 1N NaOH, and the resin must be treated with an acid to restore it to the acid salt form. Removal of the iron cyanide complex anion from the spent regenerant, to facilitate its eventual disposal, is described by Avery and Fries ("Selective Removal of Cyanide from Industrial Waste Effluents with Ion-Exchange Resins", Industrial & Engineering Chemistry Product Research & Development, Volume 14, pp 102–04, June, 1975); ferrous or ferric ions are added to precipitate the insoluble ferrous or ferric salt of the ferrocyanide or ferricyanide, which is removed by setting or filtration. The regenerant solution must first be acidified to encourage formation of the precipitate, but once formed, it is stable. Since it has been precipitated from a solution containing little more than sodium salts, it is pure, and its recovery may be economically attractive. While this approach may be used with the caustic regenerant of Fries, recovery of the regenerant itself is impractical, since the 1N sodium hydroxide was destroyed when the pH adjustment was made.

Naso and Schroeder, in "A New Method of Treating Cone Plant Waste Water", Iron and Steel Manufacturing, March, 1975, pp. 32–34, also teach that quaternary, strongly basic anion exchange resins can be used to remove anionic iron cyanide complexes from waste streams, and that the resin can be regenerated with aqueous brine solutions. They also describe removal of the iron cyanides from spent regenerant by precipitation with ferrous chloride. Excess iron is then removed from the regenerant by raising the pH to about 9, and separating the ferrous hydroxide which forms by settling or filtration. Spent regenerant which has been treated in this manner may be re-used.

Unfortunately, thiocyanates tend to be present in many of the same waste streams that contain cyanides and often at much higher concentrations. The ion exchange resins that have been used in the past to remove cyanide complexes, have about the same selectivity for thiocyanate as for the iron cyanide complexes. Especially in the case of aromatic-based quaternary resins, which are apparently the resins described by Naso and Schroeder, the thiocyanate is tightly bound to the resin, and requires excessive amounts of a brine regenerant, or a mixed brine and acid regenerant. Because of pH changes, the brine-acid mixture cannot be reclaimed, and the straight brine regenerant would be impractical to recover because of high thiocyanate levels.

Fries described one case of resin selectivity for iron cyanide complex anions over thiocyanate. The resin which exhibited this property was a weakly basic resin in the acid salt form, which suffered from previously described inadequacies of such resins with respect to multiple pH adjustment and destruction of the caustic regenerant.

It has been discovered that certain brine-regenerable, strongly basic, acrylic based anion exchange resins in the chloride form may be used in a process for selective removal of the ferrocyanide and ferricyanide complex anions from aqueous fluids containing the ferrocyanide and ferricyanide anions and other common anions including thiocyanate, that this process may be employed to treat alkaline or acidic fluids without pH adjustment, that the process may include a single-step brine regeneration of the resin without the need for pH adjustment, and that the process may include the reclamation of at least a portion of the spent regenerant for re-use in regenerating resin. The process may be used to selectively remove these iron cyanide complexes where they are present at concentrations greater than about 100 parts per billion parts of fluid, and where thiocyanate is present at concentrations greater than about five weight percent of the iron cyanide complex concentrations.

The process of this invention comprises (a) contacting an aqueous fluid containing iron cyanide complex anions and other common ions including thiocyanate ions with a strongly basic, acrylic-based anion exchange resin to remove the iron cyanide complex anions from the fluid, (b) separating the resin containing the bound iron cyanide complex anions from the treated fluid containing the thiocyanate and other common ions, (c) regenerating the resin by contacting it with a brine solution to replace the adsorbed iron cyanide complex anions, (d) separating the spent regenerant containing the iron cyanide complex anions from the regenerated resin, which is now ready for re-use, and (e) where the resin particles form a bed or mass through which the treated fluid and regenerant flow, separating that portion of the regenerant which elutes later, and re-using the late-eluting portion without further treatment to regenerate spent resin.

The regenerant solution is an aqueous solution of sodium chloride which contains from about 5 to about 25 weight percent of sodium chloride. So long as sufficient sodium chloride is introduced to the resin, the solution concentration has not been observed to have a significant effect; about 25 pounds of sodium chloride per cubic foot of the preferred resin is a typical regenerant requirement, and 30 to 40 pounds is typically used to provide a safety factor. Higher concentrations are preferred, since they permit smaller regenerant volumes, storage tanks, filters, etc., and about 15 weight percent brine is typically used.

During regeneration the great bulk of the iron cyanide complex is removed from the resin by the first half of the regenerant volume. As shown by Example 9 below, the second half of the regenerant volume contains much smaller concentrations of iron cyanide complex; these concentrations are low enough that they do not interfere with removal of the initial, high concentrations of bound iron cyanide complex from exhausted resin. Therefore, the regeneration may be operated with great efficiency by utilizing approximately the second half of the regenerant volume from the previous regeneration cycle as the first half of the regenerant volume in the subsequent cycle. This re-use of about half of the spent regenerant without any additional treatment is a significant economic advantage over processes in which regenerant must be treated or discarded.

The first half of the spent regenerant, which may contain up to several thousand parts of iron cyanide complex per million parts of regenerant, may not be re-used as a regenerant without further treatment to remove the iron cyanide complex. Such further treatment is also recommended if the spent regenerant will be discarded, to avoid environmental damage from this toxic complex. The iron cyanide may be removed by the known process of adding a ferrous or ferric salt to precipitate the ferrous or ferric ferrocyanide or ferricyanide, and separating the precipitate from the brine solution by settling or filtration. At this point the brine, which is essentially free of the iron cyanide complex, may be discarded. Alternatively, the pH of the solution may be raised to precipitate the excess iron salt as iron hydroxide, the precipitate may be removed by settling or filtration, and the pH may be re-adjusted to approximately neutral. Spent regenerant which has been so treated, and which has not acquired unacceptably high levels of thiocyanate from previous re-use, may be re-used to regenerate the exhausted resin.

The process of this invention offers the following advantages over processes known to the art which utilize weakly basic anion exchange resins in the acid salt form: (a) elimination of the acidification step prior to ion exchange treatment, (b) use of safer, less expensive brine regenerant instead of caustic, (c) elimination of spent-regenerant acidification prior to iron cyanide complex precipitation, and (d) possible reuse of spent regenerant after removal of iron cyanides by precipitation with ferrous or ferric salts.

The process of this invention offers the following advantages over processes known to the art which utilize resins made from aromatic polymers: (a) greater selectivity of the acrylic resins for iron cyanides over thiocyanate, (b) greater resistance to organic fouling of acrylic resins, (c) use of safer, less expensive brine to regenerate the acrylic resins, instead of the mixed hydrochloric acid and brine used for the aromatic-based resins, and (d) recycling of at least a portion of the spent regenerant, without further treatment, when thiocyanate is present.

The capacity of aromatic-based anion exchange resins for thiocyanate is approximately the same as their capacity for iron cyanides. The results of Example 4 below indicate that the cyanide capacity of these resins is about two pounds of cyanide per cubic foot of resin, and the thiocyanate capacity is 2.3 pounds per cubic foot. Additionally, elution of thiocyanate with brine from these resins is inefficient, with the strongly bound ion eluting even after relatively large volumes of regenerant have passed through the resin bed. In contrast, Examples 1–4 below show that the total capacity of the acrylic-based resins for iron cyanides is five to ten times greater than that for thiocyanates; thiocyanates are also readily eluted from the resin with brine.

The resins which are operable in the process of this invention are those strongly basic anion exchange resins which are prepared from crosslinked acrylic polymers, i.e., polymers of acrylic and methacrylic acid, and polymers of esters of acrylic and methacrylic acid, including the methyl, ethyl, propyl, butyl, amyl, hexyl, heptyl, octyl, nonyl and decyl esters, and including both straight and branched chain isomers of these esters. Crosslinking agents suitable for preparing these polymers are polyethylenically unsaturated compounds or mixtures thereof, and include divinylbenzene, divinylpyridine, divinyltoluenes, divinylnaphthalenes, diallyl phthalate, ethylene glycol diacrylate, ethylene glycol dimethacrylate, trimethylolpropane trimethacrylate, neopentyl glycol dimethacrylate, pentaerythritol tri- and tetramethacrylates, divinylxylene, divinylethylbenzene, divinylsulfone, divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, trivinylbenzene, trivinylnaphthalene, polyvinyl anthracenes and the polyallyl and polyvinyl ethers of glycol, glycerol, pentaerythritol, resorcinol and the monothio or dithio derivatives of glycols.

Preferred crosslinking monomers include polyvinyl aromatic hydrocarbons, such as divinylbenzene and trivinylbenzene, glycol dimethacrylates and polymethacrylates, such as ethylene glycol dimethacrylate, trimethylolpropane trimethacrylate, and polyvinyl ethers of polyhydric alcohols, such as divinoxyethane and trivinoxypropane, and polyvinyl ethers of glycol such as diethylene glycol divinyl ether. The amount of crosslinking agent can be varied widely but, since the total potential capacity of the final anion exchange resin decreases with an increase in the amount of crosslinking agent, an amount from about 2 to about 30 percent, and preferably from about 2 to about 15 percent, on a weight basis is recommended.

The gellular polymers may be prepared as described by Schneider (U.S. Pat. No. 2,675,359), and the macroreticular polymers as described by Kunin (U.S. Pat. No. 3,791,866). The strongly basic anion exchange resins are prepared by aminating the acrylic polymers with amino compounds containing at least two amino groups, at least one of which is a primary group, and subsequently quaternizing the unreacted amino groups with an alkyl halide such as methyl chloride.

The polyamino compounds which may be used to aminate the acrylate polymers include propylenediamine, imino-bis-propylamine, diethylene triamine, triethylene tetramine, N-hydroxyethyldiethylene triamine, N-aminopropylmorpholine, N-aminoethylmorpholine and dimethylaminopropylamine. The amination and quaternization procedures are described by Schneider (ibid) and Kunin (ibid).

The preferred polymer is prepared by crosslinking methyl acrylate with divinylbenzene and diethylene glycol divinyl ether, and the preferred resin is prepared by aminating the preferred polymer with dimethylaminopropylamine, followed by quaternization with methyl chloride. Both the gellular and macroreticular forms of this resin are operable in the process of this invention.

The following examples illustrate ways in which the process of the invention has been practiced. They are not intended to limit the invention except as indicated in the claims.

EXAMPLE 1

An aqueous industrial waste fluid was treated to remove the ferrocyanide ion; analysis showed the following weight concentrations of dissolved substances in the fluid:

| | |
|---|---|
| Total Ferrocyanide as $CN^-$ | 362 ppm |
| Thiocyanate as $SCN^-$ | 100 ppm |
| Total Dissolved Solids | 26,000 ppm |

The pH of the fluid was 10.5.

The strongly basic anion exchange resin used to treat the fluid was prepared from a macroreticular copolymer of 90 weight percent methyl acrylate, 2 weight percent diethylene glycol divinyl ether and 8 weight percent divinylbenzene by amination with dimethylaminopropylamine and quaternization with methyl chloride; this resin is referred to in the examples as resin A. A 2-inch-diameter column was loaded with 1200 milliliters of this resin to form a bed two feet deep and the fluid was allowed to flow through the bed at a rate of 12 bed volumes (14.4 liters) per hour. A separate sample was collected from each 10 bed volumes (12 liters) of treated effluent and this was analyzed for thiocyanate content using a colorimetric (ferric thiocyanate) procedure with the Technicon Autoanalyzer.

After samples from a total of 100 bed volumes (120 liters) of treated effluent had been collected, a composite sample was prepared representing the total volume and the composite sample was analyzed for cyanide content by the distillation procedure given in "Standard Methods for the Examination of Water and Waste Water", American Public Health Association, 13th edition. The average cyanide leakage, as determined from this composite sample, was 1.7 parts per million parts of effluent. Thus, of the 43.44 grams of ferrocyanide as $CN^-$ contained in the 120 liters of waste fluid, 43.24 grams were retained by the resin, and 0.20 grams passed through the bed with the effluent. The amount of retained ferrocyanide corresponds to 2.25 pounds $CN^-$ per cubic foot of resin, and breakthrough — the sudden rise of cyanide leakage that accompanies exhaustion of iron cyanide capacity — had not occurred, so the iron cyanide capacity of this resin, as $CN^-$, may be stated as greater than 2.25 pounds $CN^-$ per cubic foot of resin.

The following table shows that thiocyanate was retained by the resin from more than twenty bed volumes of fluid, but that thiocyanate in the remaining fluid passed through the bed. A total of 2.76 grams of thiocyanate were retained, which corresponds to a total thiocyanate capacity of 0.14 pounds $SCN^-$ per cubic foot of resin.

| Bed Volumes of Fluid | Thiocyanate in Effluent |
|---|---|
| 10 | .15 ppm |
| 20 | 15 ppm |
| 30 | 40 ppm |
| 40 | 100 ppm |
| 50 | 100 ppm |
| 60 | 100 ppm |
| 70 | 100 ppm |
| 80 | 100 ppm |
| 90 | 100 ppm |
| 100 | 100 ppm |

EXAMPLE 2

This example repeats Example 1, but at a different waste fluid flow rate. The aqueous industrial waste fluid of Example 1 was allowed to flow through a similar, 1200-milliliter bed of fresh resin at a rate of 8 bed volumes (9.6 liters) per hour; the effluent was collected and analyzed as described in Example 1. The average cyanide leakage for 100 bed volumes of effluent was 0.3 parts per million parts of effluent, indicating that of the 43.44 grams of ferrocyanide in the fluid, 0.036 grams passed through the bed. The retained ferrocyanide corresponded to 2.26 pounds $CN^-$ per cubic foot of resin, and since breakthrough had not yet occurred, the capacity of the resin was greater than 2.26 pounds of cyanide per cubic foot of resin.

At this lower flow rate thiocyanate was retained during treatment of the first forty bed volumes of fluid, but any thiocyanate in the remaining sixty bed volumes passed through the bed. A total of 3.36 grams of thiocyanate were retained, which corresponds to a total thiocyanate capacity of 0.175 pounds $SCN^-$ per cubic foot of resin.

| Bed Volumes of Fluid | Thiocyanate in Effluent, ppm |
|---|---|
| 10 | 10 |

-continued

| Bed Volumes of Fluid | Thiocyanate in Effluent, ppm |
|---|---|
| 20 | 10 |
| 30 | 25 |
| 40 | 75 |
| 50 | 100 |
| 60 | 100 |
| 70 | 100 |
| 80 | 100 |
| 90 | 100 |
| 100 | 100 |

EXAMPLE 3

This example repeats Example 1, but at a different concentration of cyanide and thiocyanate, and at a different flow rate. The industrial waste fluid contained 159 parts of ferrocyanide as $CN^-$ and 50 parts of thiocyanate per million parts of fluid, and the flow rate of the fluid through the 1200-milliliter bed of fresh resin was 16 bed volumes (19.2 liters) per hour. Samples from separate 20-bed-volume (24 liter) portions of effluent were collected until a total of 200 bed volumes (240 liters) had been treated. The average cyanide leakage during treatment of the 200 bed volumes of fluid, as determined from a composite sample, was 0.6 parts per million parts of fluid, indicating that 0.14 grams of the 38.16 grams of ferrocyanide in the fluid passed through the bed. This corresponds to 1.98 pounds of cyanide per cubic foot of resin, which is again less than the capacity of the resin, since breakthrough did not occur.

Approximately half of the thiocyanate content was removed from the first sixty bed volumes of fluid, while the thiocyanate in the remaining 140 bed volumes passed through the bed. A total of 1.80 grams of thiocyanate were retained, which corresponds to a thiocyanate capacity of 0.09 pounds per cubic foot of resin. The thiocyanate leakage at 20-bed-volume increments is shown in the following table:

| Bed Volumes of Fluid | Thiocyanate in Effluent, ppm |
|---|---|
| 20 | 25 |
| 40 | 25 |
| 60 | 25 |
| 80 | 50 |
| 100 | 50 |
| 120 | 50 |
| 140 | 50 |
| 160 | 50 |
| 180 | 50 |
| 200 | 50 |

EXAMPLE 4

The purpose of this example is to compare the selectivity of aromatic-based and acrylic-based resins for iron cyanide complexes over thiocyanates. The first of two similar, parallel columns contained a 20-milliliter bed of resin A and the second contained a 20-milliliter bed of an aromatic, quaternary, strongly basic anion exchange resin. A total of 200 bed volumes (4.0 liters) of an aqueous solution having the following composition was pumped through each column at a rate of 8 bed volumes (160 milliliters) per hour:

| Sodium sulfate | 1000 ppm |
|---|---|
| Sodium Chloride | 1000 ppm |
| Ferrocyanide as $CN^-$ | 25 ppm |
| Thiocyanate as $SCN^-$ | 250 ppm |
| Ammonia as $NH_4Cl$ | 500 ppm |

-continued

| pH | 8.5 |
|---|---|

Levels of cyanide and thiocyanate ions in the column effluents were determined according to the procedures given in "Standard Methods for the Examination of Water and Waste Water", American Public Health Association, 13th edition. The aromatic-based resin retained 0.753 grams of thiocyanate to breakthrough, which corresponds to 2.35 pounds of thiocyanate per cubic foot of resin. The acrylic-based resin A retained about 0.153 grams of thiocyanate to breakthrough, which corresponds to 0.48 pounds of thiocyanate per cubic foot of resin. The following table shows cyanide and thiocyanate leakages.

| Bed Volumes of Effluent | Aromatic-Based Resin | | Acrylic-Based Resin A | |
|---|---|---|---|---|
| | CN (ppm) | SCN (ppm) | CN (ppm) | SCN (ppm) |
| 25 | 0.03 | 0.06 | .06 | 10 |
| 50 | 0.05 | 0.00 | .08 | 184 |
| 75 | 0.08 | 1 | .16 | 239 |
| 100 | 0.16 | 1 | .24 | 239 |
| 150 | 0.20 | 6 | .29 | 253 |
| 200 | 0.28 | 240 | .60 | 240 |

EXAMPLE 5

To demonstrate that resin A is selective for both ferricyanide and ferrocyanide, an aqueous solution having the following composition was pumped through a fresh, 20-milliliter bed of resin A at a flow rate of 8 bed volumes/hour.

| Ferrocyanide as $CN^-$ | 100 ppm |
|---|---|
| Ferricyanide as $CN^-$ | 100 ppm |
| Sodium Sulfate | 1000 ppm |
| Sodium Carbonate | 1000 ppm |
| Thiocyanate as $SCN^-$ | 250 ppm |

Composite samples were taken from the following portions of the effluent, and were analyzed for total cyanide and thiocyanate content:

| Bed Volumes of Effluent | Total Cyanide, ppm | Thiocyanate, ppm |
|---|---|---|
| 0–25 | 0.48 | 0 |
| 25–45 | 1.0 | 68 |
| 45–100 | 1.0 | 302 |

EXAMPLE 6

The purpose of this example is to determine the effect of multiple loading and regeneration cycling upon the cyanide complex capacity of the anion exchange resin. A 20-milliliter bed of fresh resin A was prepared in a column similar to that of Example 4. The resin bed was loaded by pumping 100 bed volumes (2.0 liters) of the industrial waste fluid described in Example 1, containing 318 parts per million of ferrocyanide as $CN^-$, through it at a rate of 16 bed volumes (320 milliliters) per hour. The resin bed was regenerated at room temperature by pumping 5 to 8 bed volumes (100 to 160 milliliters) of 15% (weight) aqueous sodium chloride solution through it at a rate of 2 bed volumes (40 milliliters) per hour. This loading and regeneration cycle was repeated until the column had been loaded 91 times. It was regenerated with 5 bed volumes (100 milliliters of 15% (weight) aqueous sodium chloride solution, rinsed with water, and backwashed. The industrial waste fluid containing 318 parts per million of ferrocyanide as $CN^-$ was again pumped through the resin bed, and through a similar bed containing fresh resin A, at a rate of 8 bed volumes (160 milliliters) per hour, and the cyanide content of each 15 bed volumes (300 milliliters) of effluent from each column was determined.

Breakthrough, defined as the sudden increase of cyanide in the effluent caused by exhausting the capacity of the resin, occurred after aproximately 75 bed volumes (1.50 liters) of fluid had passed through the multiply cycled resin, and after approximately 78 bed volumes (1.56 liters) of fluid had passed through the fresh resin. The respective capacities of multiply cycled and fresh resins, calculated from the weight of ferrocyanide as $CN^-$ in the input fluid volume to breakthrough, were 1.49 and 1.55 pounds of cyanide per cubic foot of resin. The difference between these capacities was 0.06 pounds per cubic foot, or less than 4 percent of the capacity of fresh resin A.

EXAMPLE 7

This example demonstrates the operability of the gellular form of acrylic-based resins in the process of the present invention. The resin used is a gellular anion exchange resin prepared as described for Resin A from a copolymer of 3.7 weight percent divinylbenzene, 0.5 weight percent diethylene glycol divinyl ether, and 95.8 weight percent methyl acrylate; this gellular resin is designated resin B.

As industrial waste fluid containing approximately 2.5 percent by weight of total dissolved solids, 350 parts per million by weight of ferrocyanide as $CN^-$ and 250 parts per million by weight of thiocyanate as $SCN^-$ was pumped through a 20-milliliter bed of fresh resin B at a rate of 12 bed volumes per hour. Cyanide breakthrough occurred at approximately 90 bed volumes; of the 0.6300 grams of ferrocyanide in that volume of fluid, 0.6181 grams had been retained by the resin. This corresponds to a resin capacity of 1.93 pounds of cyanide per cubic foot of resin.

This industrial waste fluid is suspected of containing free cyanide in addition to ferrocyanide. Free cyanide is not readily removed by the anion exchange resins of this invention, and it also is not distinguished from ferrocyanide by the analytical procedures used here. The presence of free cyanide is thought to explain the higher cyanide leakage observed in this example.

Thiocyanate was adsorbed for slightly more than 30 bed volumes, and a total of 0.1410 grams of thiocyanate were adsorbed. This corresponds to a resin capacity of 0.44 pounds of thiocyanate per cubic foot of resin. The following table shows the average leakage of cyanide and thiocyanate in each ten bed volumes of effluent.

| Bed Volumes of Fluid | Cyanide Leakage,ppm | Thiocyanate Leakage,ppm |
|---|---|---|
| 10 | 1.5 | 4 |
| 20 | 2.5 | 8 |
| 30 | 3.0 | 45 |
| 40 | 6.0 | 238 |
| 50 | 6.0 | 250 |
| 60 | 7.0 | 250 |
| 70 | 7.5 | 250 |
| 80 | 10 | 250 |
| 90 | 16 | 250 |
| 100 | 44 | 250 |
| 110 | 340 | 250 |
| 120 | 352 | 250 |

EXAMPLE 8

To compare aromatic-based resins with acrylic-based resins operable in the process of this invention, with respect to their capacities for iron cyanides and thiocyanate, an industrial waste stream containing approximately 2.5 percent by weight of total dissolved solids, 370 parts per million by weight of ferrocyanide as $CN^-$, and 280 parts per million by weight of thiocyanate as $SCN^-$, was pumped through a pair of parallel, 20-milliliter resin beds at a rate of 12 bed volumes (240 milliliters) per hour. The resin in one bed was an aromatic-based, quaternary, strongly basic anion exchange resin, the same resin that was used in Example 4. The resin in the other bed was the acrylic-based resin A.

The following table summarizes the results for leakage of cyanide and thiocyanate, breakthrough volumes, weight of each anion retained, and resin capacity. The iron cyanide capacities of the two resins are similar, but the thiocyanate capacities differ markedly; that of the aromatic-based resin is almost as great as its iron cyanide capacity, while the thiocyanate capacity of resin A is only about one third as great as its iron cyanide capacity.

|  | Resin A | | Aromatic Resin | |
|---|---|---|---|---|
| Bed Volumes | CN Leakage ppm | SCN Leakage ppm | CN Leakage ppm | SCN Leakage ppm |
| 10 | 0.8 | 8 | 0.8 | 34 |
| 20 | 0.8 | 26 | 0.8 | 26 |
| 30 | 0.8 | 105 | 1.2 | 26 |
| 40 | 0.8 | 220 | 1.2 | 24 |
| 50 | 2.0 | 280 | 1.6 | 28 |
| 60 | 8.8 | 280 | 2.0 | 47 |
| 70 | 38 | 280 | 13 | 46 |
| 80 | 137 | 280 | 156 | 280 |
| 90 | 279 | 280 | 299 | 280 |
| 100 | 328 | 280 | 368 | 280 |
| Breakthrough Volume | 60 BV | 20 BV | 60 BV | 70 BV |
| Grams Retained at Breakthrough | .4172 | .1052 | .4185 | .3454 |
| Resin Capacity Lb/ft³ (at breakthrough) | 1.30 | .33 | 1.31 | 1.08 |
| Total SCN Capacity, Lb/ft³ | — | .48 | — | 1.08 |

EXAMPLE 9

This example demonstrates the regeneration with brine of the acrylic-based resins operable in the process of this invention. A 20-milliliter bed of resin A was fully loaded with ferrocyanide ion by pumping an excess of an industrial waste fluid, containing 249 parts per million by weight of ferrocyanide as $CN^-$, 50 parts per million by weight of thiocyanate, and about 2.5 weight percent of total dissolved solids, through the bed. The resin bed was regenerated by pumping ten bed volumes of 15 weight percent aqueous sodium chloride solution through it at the rate of two bed volumes per hour; the cyanide content of each two bed volumes of spent regenerant was determined, and is shown in the following table:

| | Resin A | |
|---|---|---|
| Bed Volumes | CN Content ppm | Total CN Eluted,g |
| 0–2 | 3320 | 0.1328 |
| 2–4 | 5640 | 0.2256 |
| 4–6 | 160 | 0.0064 |
| 6–8 | 30 | 0.0012 |
| 8–10 | 26 | 0.0010 |
| TOTAL | | 0.3670 |

I claim:

1. A process for separating iron cyanide complex anions from an aqueous fluid comprising thiocyanate anions and anions of at least one iron cyanide complex selected from the group consisting of ferrocyanide and ferricyanide, said iron cyanide complex anions being present at a concentration of at least about 100 parts per billion parts of said fluid, and said thiocyanate anions being present at a concentration of at least five weight percent of the iron cyanide complex anion concentration, said process comprising: (a) contacting said fluid with an acrylic, strongly basic anion exchange resin having the ability to adsorb the iron cyanide complex anions preferentially over the thiocyanate anions, and (b) separating said fluid from said resin.

2. The process according to claim 1 wherein the acrylic based, strongly basic anion exchange resin is the quaternary ammonium salt of crosslinked N-(dimethylaminopropyl)acrylamide.

3. The process according to claim 2 wherein the polymer is crosslinked with from about 2 to about 15 weight percent of at least one polyethylenically unsaturated crosslinking agent.

4. The process according to claim 1 wherein the exhausted resin is regenerated by contacting it with an aqueous solution of sodium chloride, and separating said solution from the resin.

5. The process according to claim 4 wherein the concentration of the sodium chloride solution is between about 1 and about 25 percent by weight.

6. The process according to claim 1 wherein at least a portion of sodium chloride solution which has been used to regenerate said exhausted resin is re-used without further treatment for resin regeneration.

7. The process according to claim 1 wherein said aqueous fluid comprises anions of thiocyanate, ferrocyanide and ferricyanide.

8. The process according to claim 1 wherein said iron cyanide complex anions are present at a concentration from about 50 to about 1000 parts per million parts of said aqueous fluid.

9. The process according to claim 8 wherein the iron cyanide complex anions are present as ferricyanide anions.

10. The process according to claim 8 wherein said iron cyanide complex anions are present as ferrocyanide anions.

* * * * *